US008516082B2

(12) United States Patent
Cadwell et al.

(10) Patent No.: US 8,516,082 B2
(45) Date of Patent: Aug. 20, 2013

(54) PUBLISHING-POINT MANAGEMENT FOR CONTENT DELIVERY NETWORK

(75) Inventors: Eric Cadwell, Phoenix, AZ (US); Jon B. Corley, Peoria, AZ (US); Mohan I. Kokal, Peoria, AZ (US); Tamara Monson, Scottsdale, AZ (US)

(73) Assignee: Limelight Networks, Inc., Tempe, AZ (US)

(*) Notice: Subject to any disclaimer, the term of this patent is extended or adjusted under 35 U.S.C. 154(b) by 387 days.

(21) Appl. No.: 12/723,533

(22) Filed: Mar. 12, 2010

(65) Prior Publication Data
US 2010/0250710 A1 Sep. 30, 2010

Related U.S. Application Data

(60) Provisional application No. 61/163,412, filed on Mar. 25, 2009.

(51) Int. Cl.
*G06F 15/16* (2006.01)

(52) U.S. Cl.
USPC .......................... 709/219; 709/231

(58) Field of Classification Search
USPC .................. 709/219, 231; 370/386
See application file for complete search history.

(56) References Cited

U.S. PATENT DOCUMENTS

| | | | |
|---|---|---|---|
| 6,415,280 B1 | 7/2002 | Farber et al. | |
| 6,658,000 B1 * | 12/2003 | Raciborski et al. | 370/386 |
| 6,754,699 B2 | 6/2004 | Swildens et al. | |
| 7,111,057 B1 | 9/2006 | Sherman et al. | |
| 7,133,905 B2 | 11/2006 | Dilley et al. | |
| 7,274,658 B2 | 9/2007 | Bornstein et al. | |
| 7,299,275 B2 | 11/2007 | Tsukidate et al. | |

(Continued)

OTHER PUBLICATIONS

Kim et al., "Multimedia Data Transmission Using Multicast Delivery in Digital Library", 2003, Springer Berlin Heidelberg, 6th International Conference on Asian Digital Libraries, ICADL 2003, Kuala Lumpur, Malaysia, Dec. 8-12, 2003. Proceedings, pp. 206-217.*

(Continued)

*Primary Examiner* — Lynn Feild
*Assistant Examiner* — Taylor Elfervig
(74) *Attorney, Agent, or Firm* — Kilpatrick Townsend & Stockton LLP

(57) ABSTRACT

A system and method for delivering content objects over the Internet to an end user system with a content delivery network (CDN) is disclosed. The system and method allow for dynamically serving content objects by loading and/or reconfiguring publishing points upon receipt of an end user request. When a content object is requested by an end user media player, the request is assigned to an edge server within a particular POP of the CDN. An optional peer-discovery algorithm is used to determine a content source for the requested content object within the CDN. The peer-discovery algorithm first determines whether the publishing point associated with the requested content object is loaded into the edge server. Alternatively, the peer-discovery algorithm queries other edge servers within or remote from the particular POP to determine whether the request for content object is mapped by other edge servers to a content source using their respective publishing points. Once the content source for the requested content object is determined, the edge server reconfigures its publishing point toward the content source. Ultimately, the content object is streamed to the end user media player. Management of the publishing points avoids performance degradations on the edge server in some embodiments.

18 Claims, 11 Drawing Sheets

(56) References Cited

U.S. PATENT DOCUMENTS

| | | | |
|---|---|---|---|
| 7,502,858 | B2 | 3/2009 | Gupta et al. |
| 7,640,303 | B2 | 12/2009 | Blumofe |
| 7,752,258 | B2 | 7/2010 | Lewin et al. |
| 2002/0163882 | A1 | 11/2002 | Bornstein et al. |
| 2005/0010653 | A1 | 1/2005 | McCanne |
| 2005/0015509 | A1* | 1/2005 | Sitaraman ............... 709/231 |
| 2006/0230170 | A1* | 10/2006 | Chintala et al. ........... 709/231 |
| 2007/0025327 | A1 | 2/2007 | Raciborski et al. |
| 2007/0118668 | A1 | 5/2007 | McCarthy et al. |
| 2007/0183342 | A1 | 8/2007 | Wong et al. |
| 2008/0072264 | A1 | 3/2008 | Crayford |
| 2008/0092058 | A1* | 4/2008 | Afergan et al. ............ 715/745 |
| 2008/0155061 | A1 | 6/2008 | Afergan et al. |
| 2008/0155110 | A1 | 6/2008 | Morris |
| 2009/0070533 | A1* | 3/2009 | Elazary et al. ............ 711/133 |
| 2009/0300202 | A1 | 12/2009 | Hogan et al. |
| 2010/0030908 | A1* | 2/2010 | Courtemanche et al. ..... 709/231 |
| 2012/0066352 | A1 | 3/2012 | Cadwell et al. |

OTHER PUBLICATIONS

Wei Bin; Wang Xiaoli; Liu Shide; Wang Xiaoli, "Digital Workflow Integration for Map Publishing," Computer Science and Software Engineering, 2008 International Conference on, vol. 6, no., pp. 326,328, Dec. 12-14, 2008.*

U.S. Appl. No. 13/245,861, Office Action mailed Jan. 20, 2012, 36 pages.

U.S. Appl. No. 13/245,861, Final Office Action mailed Jun. 6, 2012, 35 pages.

Dave Nelson, "Creating and Managing Live Smooth Streaming Publishing Points", Retrieved on Feb. 25, 2013 from http://www.iis.net/learn/media/live-smooth-streaming/creating-and-managing-live-smooth-streaming-publishing-points, Mar. 20, 2009.

"Deliver Digital Media Effectively over Wide-Area Networks", Retrieved on Feb. 25, 2003 from http://www.cisco.com/en/US/prod/collateral/contnetw/ps5680/ps491/ps6049/product_data_sheet0900aecd80261a22.pdf, 2006, pp. 1-9, Cisco.

Hsu, Cheng-Hsin et al., ISP-Friendly Peer Matching Algorithms, SIGCOMM '08, Aug. 17-22, 2008, Seattle, WA, 2 pages.

* cited by examiner

PUBLISHING-POINT MANAGEMENT FOR CONTENT DELIVERY NETWORK

This application claims the benefit of and is a non-provisional of U.S. Provisional Application Ser. No. 61/163,412 filed on Mar. 25, 2009, which is hereby expressly incorporated by reference in its entirety for all purposes.

BACKGROUND

This disclosure relates in general to media servers and, but not by way of limitation, to heavily loaded media servers.

Content delivery networks (CDNs) deliver content on the Internet for others. Many different customers can use edge servers of various points of presence (POPs). There can be many thousands of different content objects that an edge server might deliver to requesters over time. Each piece of content is mapped to a location that serve directly or indirectly the content. Overhead for this mapping is not insignificant.

For example, Windows Media Server™ calls a mapping between a request and a serving location a publication point. Beyond a few thousand publication points, Windows Media Server™ has difficulty. Other servers have to trade off what they can track efficiently without overloading other resources CDNs need to potentially map far larger amounts of publication points without sacrificing performance.

CDNs can cache and host content. With a distributed network of high performing POPs, the CDN can deliver content with a quality of service that far exceeds the capability of most content providers. Scalability is built-into the CDN architecture and is a key feature as more computing moves into the cloud. Capabilities of individual media servers can hamper that scalability.

SUMMARY

In one embodiment, the present disclosure provides a system and method for delivering content objects over the Internet to an end user system with a content delivery network (CDN). The system and method allow for dynamically serving content objects by loading and/or reconfiguring publishing points upon receipt of an end user request. When a content object is requested by an end user media player, the request is assigned to an edge server within a particular point of presence (POP) of the CDN. An optional peer-discovery algorithm is used to determine a content source for the requested content object within the CDN. The peer-discovery algorithm first determines whether the publishing point associated with the requested content object is loaded into the edge server. Alternatively, the peer-discovery algorithm queries other edge servers within or remote from the particular POP to determine whether the request for content object is mapped by other edge servers to a content source using their respective publishing points. Once the content source for the requested content object is determined, the edge server reconfigures its publishing point toward the content source. Ultimately, the content object is streamed to the end user media player. Management of the publishing points avoids performance degradations on the edge server in some'embodiments.

In one embodiment, a content delivery network (CDN) for dynamically serving a content object over the Internet to an end user system is disclosed. The CDN includes a content object request function, POPs, an edge server selection function, a purging function, and a streaming function. The content object request function receives a request for streaming content object to the end user system. The POPs are geographically distributed, and each of the POPs comprises servers including an edge server. The edge server selection function assigns the request to the edge server in the POP. The edge server loads publishing points, where each publishing point maps a request for content to a content source. The purging function removes a subset of the publishing points according to an algorithm. The streaming function streams the content object to the end user system.

In another embodiment, a method for dynamically serving a content object over the Internet to an end user system with a CDN is disclosed. A request to stream the content object to the end user system is received. The CDN comprises a POPs, which are geographically distributed. The POPs include servers including an edge server. The edge server loads publishing points, wherein each publishing point maps a request for content to a content source. The request is assigned to the edge server in the POP, which is part of the POPs. The request is correlated to a publishing point associated with the content object, wherein the publishing point is part of the publishing points. It is determined whether the publishing point is loaded into the edge server. The publishing point of the edge server is mapped to the content source. A subset of the publishing points is removed according to an algorithm. The content object is streamed from the edge server to the end user system.

In yet another embodiment, a CDN for dynamically serving a content object over the Internet to an end user system is disclosed. The CDN comprises points of presence (POPs), which are geographically distributed. Each of the POPs comprises servers including an edge server. The edge server loads a publishing points, wherein each publishing point maps a request for content to a content source. The CDN comprising: means for receiving a request to stream the content object to the end user system; means for assigning the request to the edge server in the POP, which is part of the POPs; means for correlating the request to a publishing point associated with the content object, wherein the publishing point is part of the publishing points; means for determining whether the publishing point is loaded into the edge server; means for mapping the publishing point of the edge server to the content source; means for removing a subset of the publishing points according to an algorithm; and means for streaming the content object from the edge server to the end user system.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the invention as set forth in the appended claims.

Figure 1:
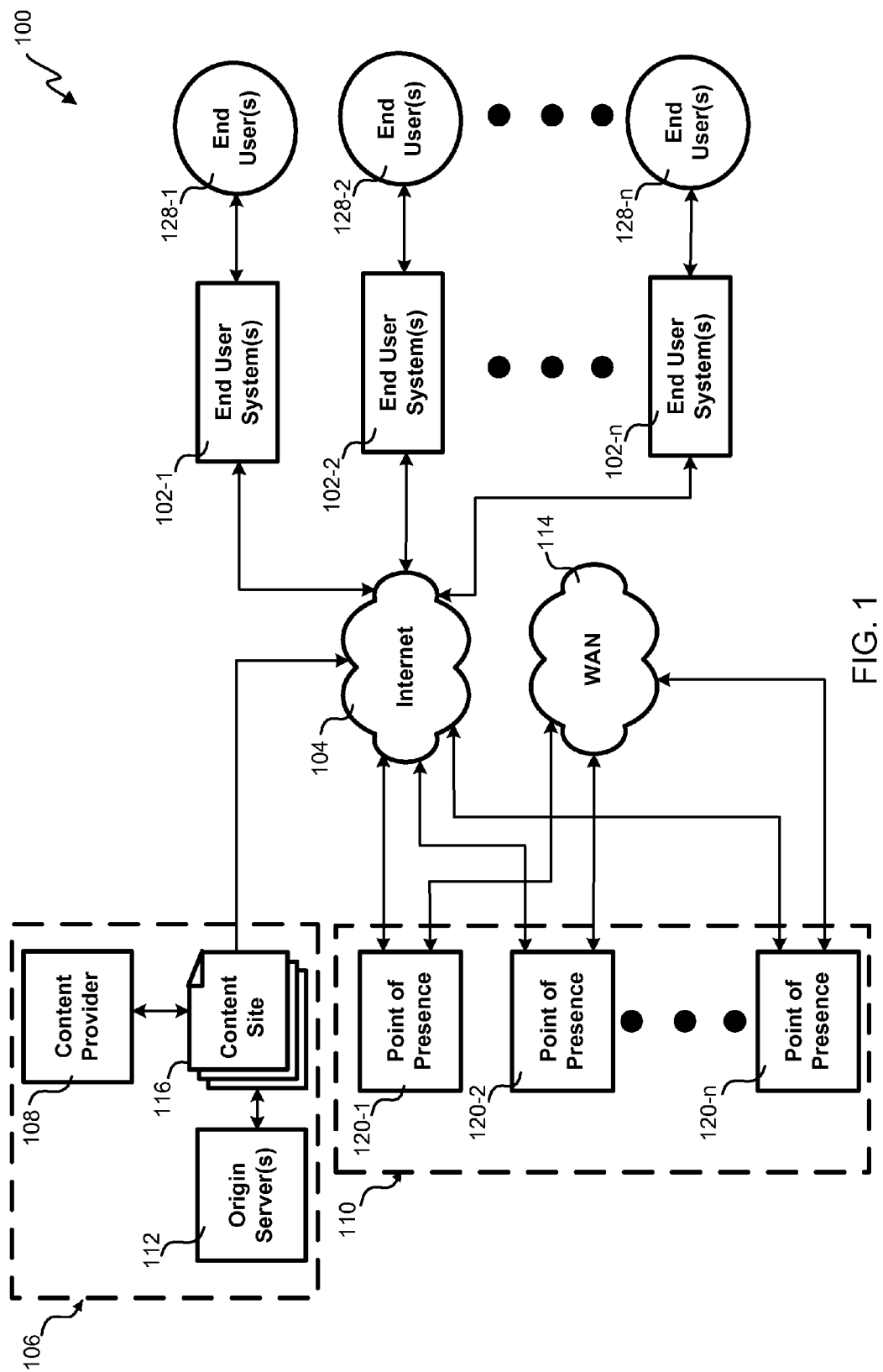
FIG. 1 depicts a block diagram of an embodiment of a content distribution system.

Referring first to FIG. 1, a block diagram of an embodiment of a content distribution system 100 is shown where a content originator 106 offloads delivery of the content objects to a content delivery network (CDN) 110. In this embodiment, the content distribution system 100 can dynamically serve content objects over the Internet 104 to end user systems 102 by loading and/or reconfiguring publishing points upon receipt of an end user request for content or when other conditions are met. In this way, only publishing points related to the requested content are loaded into the edge servers such that the CDN 110 may avoid overhead associated with publishing points that are unlikely to be used.

The publishing points translate or map an end user request for content into a physical path(s) where the content can be found or delivered from. The publishing point also can include information relevant to the content object. The term "publishing point" is typically used for Windows Media™ serving platforms, but embodiments also operate on other platforms such as Flash™, Linux™, and/or other media serving platforms. As used herein, the publishing point is any string of information used to map content to content requests. The publishing points are individually manageable for deletion. The publishing points could be stored in a look-up table, a database or file. Volatile memory in each edge server holds the publishing points. The end user request for content could be in the form of a universal resource indicator (URI) or a portion thereof. The source of the content could be on an edge server or any other server within the CDN. The edge server may cache the content or relay the request and deliver to another server.

A content originator 106 produces and/or distributes content objects as the originator of content in a digital form for distribution with the Internet 104. Included in the content originator 106 are a content provider 108, a content site 116 and an origin server 112. The figure shows a single origin server 112, but it is to be understood embodiments could have multiple origin servers 112 that each can serve streams of the content object redundantly. For example, the content originator 106 could have multiple origin servers 112 and assign any number of them to serve the content object.

Although, this figure only shows a single content originator 106 and a single CDN 110, there may be many of each in other embodiments. The content object is any content file or content stream and could include, for example, video, pictures, advertisements, applet, data, audio, software, and/or text. The content object could be live, delayed or stored. Throughout the specification, references may be made to a content object, content, content stream and/or content file, but it is to be understood that those terms could be generally used interchangeably wherever they may appear.

Many content providers 108 use the CDN 110 to deliver the content objects over the Internet 104 to end users 128. When a content object is requested by an end user 128, the CDN 110 may retrieve the content object from the content provider 108. Alternatively, the content provider 108 may directly provide the content object to the CDN 110, i.e., in advance of the first request or in servicing the first request. In this embodiment, the content objects are provided to the CDN 110 through caching and/or pre-population algorithms and stored in one or more servers such that requests may be served from the CDN 110. The origin server 112 holds a copy of each content object for the content originator 106. Periodically, the contents of the origin server 112 may be reconciled with the CDNs 110 through a cache and/or pre-population algorithm. Some embodiments could populate the CDN 110 with content objects without having an accessible origin server such that the CDN serves as the origin server, a host or a mirror.

The CDN 110 includes a number of points of presence (POPs) 120, which are geographically distributed through the content distribution system 100. Various embodiments may have any number of POPs 120 within the CDN 110 that are generally distributed in various locations around the Internet 104 to be proximate, in a network quality of service (QoS) sense, to end user systems 102. A wide area network (WAN) 114 or other backbone may couple the POPs 120 with each other and also couple the POPs 120 with other parts of the CDN 110. Other embodiments could couple POPs 120 together with the Internet optionally using encrypted tunneling.

When an end user 128 requests a content link through its respective end user system 102, the request for the content is passed either directly or indirectly via the Internet 104 to the content originator 106. The request for content, for example, could be an HTTP Get command sent to an IP address of the content originator 106 after a look-up that finds the IP address. The content originator 106 is the source or re-distributor of content objects. The content site 116 is accessed through a content web site 116 in this embodiment by the end user system 102. In one embodiment, the content site 116 could be a web site where the content is viewable by a web browser. In other embodiments, the content site 116 could be accessible with application software other than a web browser. The content provider 108 can redirect content requests to any CDN 110 after they are made or can formulate the delivery path beforehand when the web page is formulated to point to the CDN 110. In any event, the request for content is handed over to the CDN 110 for fulfillment in this embodiment.

Once the request for content is passed to the CDN 110, the request is associated with a particular POP 120 within the CDN 110. A routing algorithm used to choose between different POPs 120 could be based upon efficiency, randomness, and/or proximity in Internet terms, defined by the fabric of the Internet and/or some other mechanism. The particular POP 120 then assigns or routes the request to an edge server, which serves the content immediately to the end user system 102 if the publishing point associated with the requested content is already loaded into the edge server.

Where a publishing point is not already loaded for the content request, the edge server determines a content source within the CDN 110 by querying other peer servers within or remote from the particular POP 120. This embodiment dynamically discovers peer servers, which have already cached or stored the requested content. The peer server that already holds the requested content could be an edge server or a server that doesn't service end user requests, for example, a relay server or ingest server. If the content cannot be found in the POP 120 originally receiving the request, neighboring POPs 120 could serve as the source in some cases, or the content could be sourced from the content originator 106.

After the content source for the requested content is determined, a publishing point is formulated and loaded by the edge server that originally was assigned the request. The publishing point associated with the requested content object is configured or mapped toward the content source and the requested content is streamed to the end user system 102. The publishing point is kept loaded for a period of time thereafter, unless it goes unused for some period of time, whereupon it may be purged using a caching algorithm that prunes publishing points for content unlikely to be requested. The caching algorithms take into account time that a publishing point has gone unused and/or a threshold number of publishing points that are desired to be loaded at one time. Additionally, any currently being sourced content objects could have their publishing points protected from pruning.

The end user system 102 processes the content for the end user 128 using a content player upon receipt of the content object. The end user system 102 could be a personal computer, media player, handheld computer Internet appliance, phone, IPTV set top, streaming radio or any other device that can receive and play content objects. In some embodiments, a number of end user systems 102 can be networked together sharing a single connection to the Internet 104.

Figure 2A:
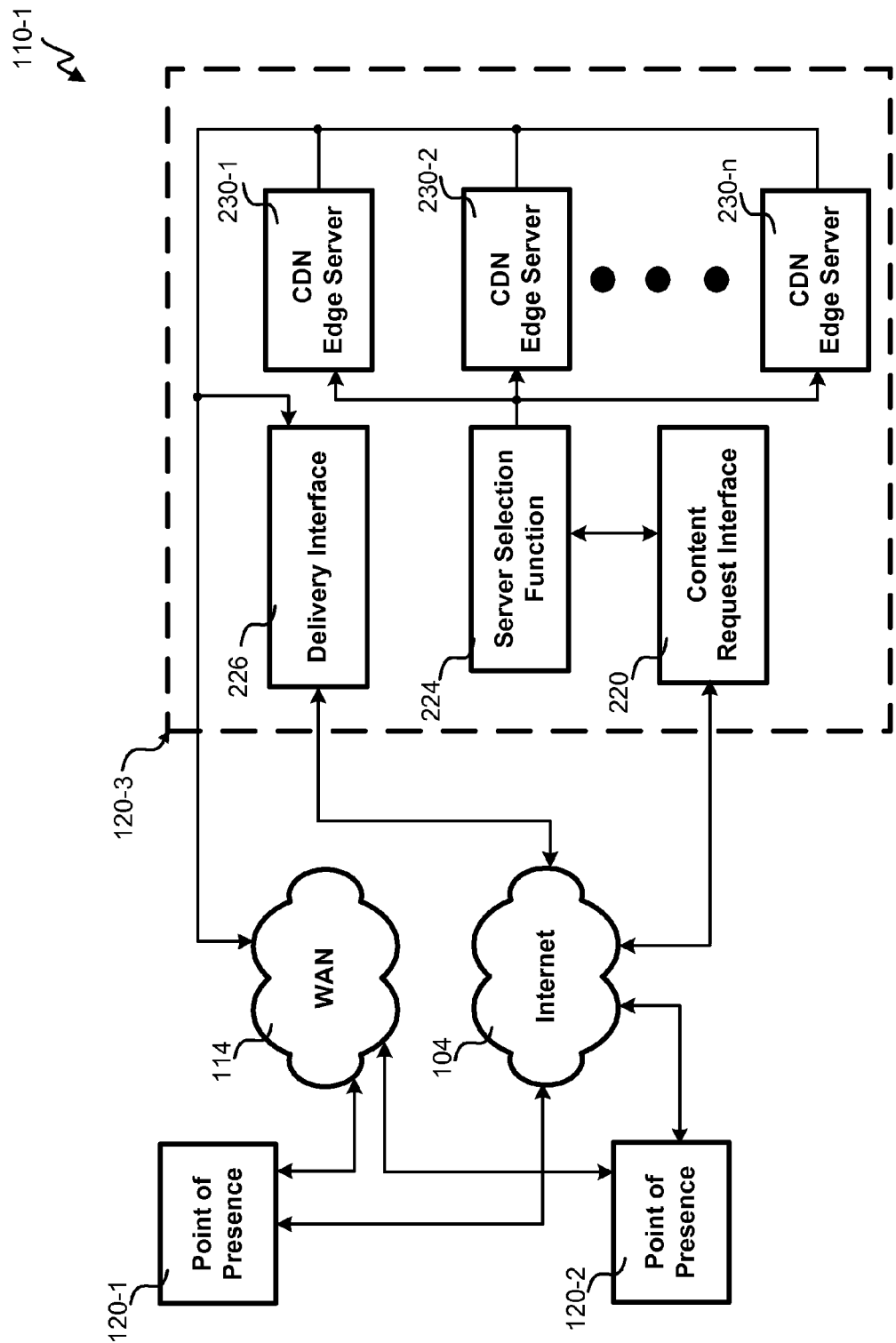
FIGS. 2A, 2B and 2C depict block diagrams of embodiments of a content delivery network (CDN) coupled to the Internet.

Referring next to FIG. 2A, a block diagram of an embodiment of the CDN 110-1 is shown coupled to the Internet 104 with additional detail for one of the POPs 120. Each POP 120 may include a content request interface 220, a server selection function 224, a delivery interface 226, a number of CDN edge servers 230, and other servers (not shown). For simplicity, this embodiment only shows three POPs 120 within the CDN 110, however any number of POPs may exist in various embodiments.

As explained above in relation to FIG. 1, when a request for content is handed over to the CDN 110, the request is associated with a particular POP 120 within the CDN 110 using any number of algorithms. For example, the assignment could be round-robin, random, based upon loading of the edge server, distance between POP and end user, and/or other algorithms. The particular POP 120 receives the request through a content request interface 220 and distributes the request to the server selection function 224. The server selection function 224 assigns the request for content to an edge server 230 to stream the content object to the end user system 102. The server selection function 224 selects the edge server 230 from a group of edge servers 230 in the POP 120. A number of algorithms can be used to assign the request to an edge server 230. For example, the server selection function 224 may use routing algorithms, domain name service (DNS) resolution or an HTTP-redirect to direct a particular end user system 102 to a particular edge server 230.

Various parameters may be taken into account for selection of the edge server 230. Examples of parameters influencing selection of the particular edge server may include content object characteristics, server assignment to a particular content provider, adequate quality of service (QoS), performance metrics, capabilities of the edge server 230, and/or routing efficiency between the edge server 230 and end user system 102. Embodiments could have any number of edge servers 230 within each POP 120 of the CDN 110.

When the request for content is assigned to the edge server 230, the edge server 230 determines a content source for the requested content object using a peer-discovery algorithm when a publishing point isn't already loaded in the assigned edge server 230. As will be described further below in various embodiments, the peer-discovery algorithm first determines whether a publishing point associated with the requested content is loaded into the edge server 230 receiving the request. If the publishing point is loaded already, the edge server 230 serves the requested content to the end user system 102 through the delivery interface 226 using the existing publishing point. Where there is no publishing point, the peer-discovery algorithm queries other peer servers within or external to the POP 120 to determine whether the request for content is mapped by other edge servers 230 to a content source through their respective publishing points. Other embodiments could check for the content object on storage for each edge server 230 rather than looking for publishing points. Regardless, a source for the content is found and a publishing point mapping the edge server to that content source is formulated for storage on the edge server 230 and available to future requestors.

If a peer server has a publishing point such that the peer server is likely to have the content cached, the edge server 230 receiving the request can point its publishing point to the cache or store of the peer server. Once the content source for the requested content object is determined, the edge server 230 configures its publishing point toward the content source and streams the requested content to the end user system 102 via the delivery interface 226. Rather than using a peer server, the edge server 230 receiving the request may retrieve the requested content from the content provider 108 or any other server with the content and serve the content object to the end user system 102 with an appropriate publishing point mapped to the cache or store of the edge server 230 that received the original request. The cache or store would receive the content object from the content provider 108 or other server and map the local copy to the request using the publishing point.

Some embodiments select one of the edge servers 230 to serve a particular content object for all requests in the POP 120. Where the edge server 230 receiving the request serves the content from a source external to its POP, like the content provider 108 or another POP 120, the edge server 230 would become the master for its POP 120 such that other edge servers 230 in the same POP would use the master edge server 230 found during peer discovery rather than getting the content externally. Other edge servers 230 receiving a request for the content object would find the master edge server 230 using peer discovery.

Although this embodiment chooses a single edge server 230 other embodiments could assign the same content object request to multiple edge servers 230 on different occasions. To balance the load, for example, a variable number of edge servers 230 could be selected for a particular request such that they shared the delivery load. An edge server 230 without a particular content object could act as a relay to get the content object from a peer or neighboring edge server. The number of relay edge servers for a group of content object requests is configurable based on a number of factors, for example, stream name, customer name, service type, customer preference, number of edge servers, loading of edge servers, etc.

Figure 2B:
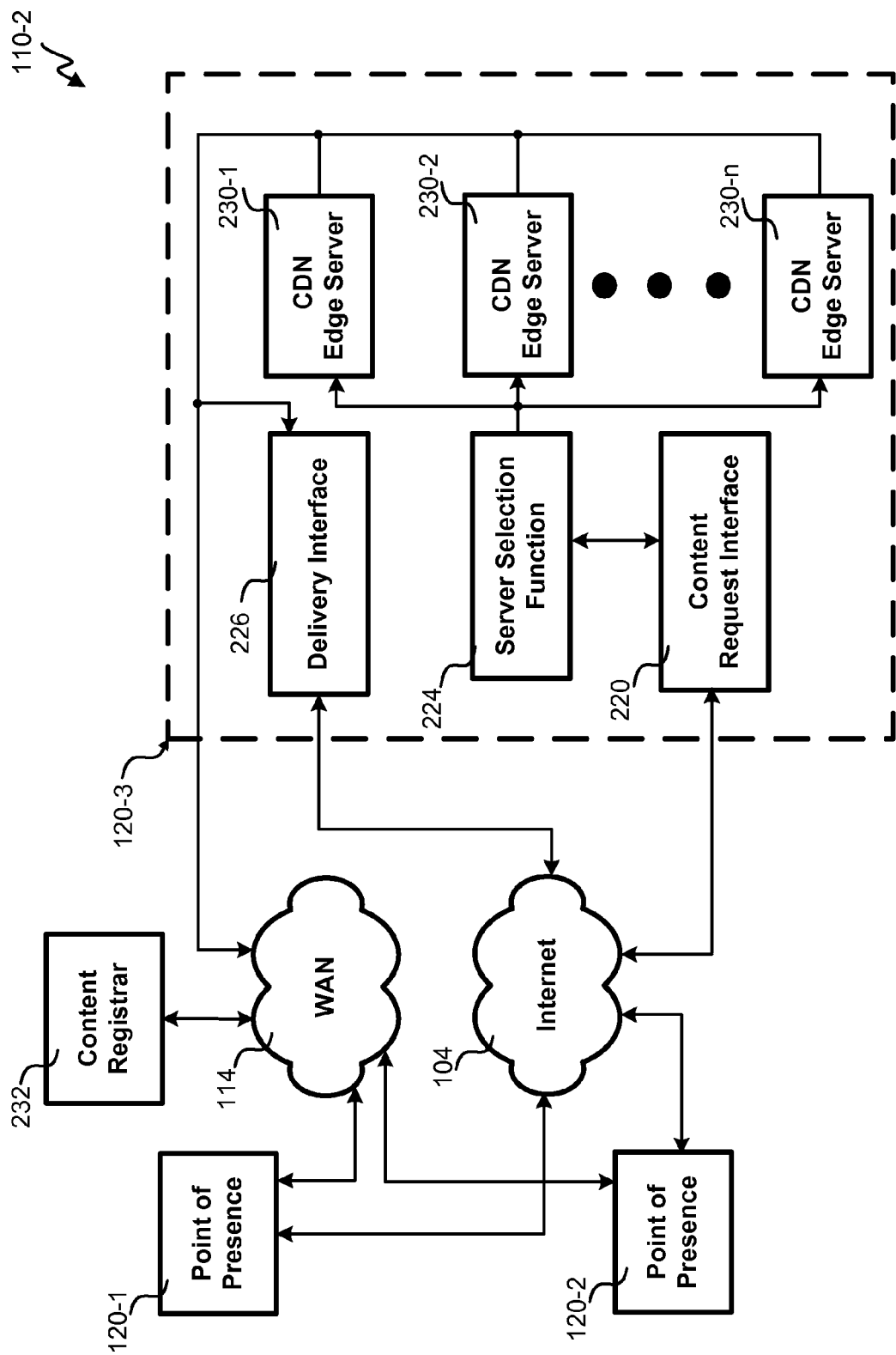

With reference to FIG. 2B, a block diagram of another embodiment of the CDN 110-2 is shown coupled to the Internet 104 with additional detail for one of the POPs 120. This embodiment adds a content registrar 232 coupled to the WAN 114, but it could be coupled to the Internet 104 in other embodiments. The content registrar 232 receives reports from all potential peer servers of the content that they are serving as the master for in a particular POP 120. During peer discovery, the content registrar 232 can be queried rather than multiple queries to peer servers. The content registrar 232 can identify the peer server in the POP 120 or other POPs 120 to allow peer discovery with less queries in this embodiment.

Some embodiments could appreciate that a peer server, master edge server or content registrar 232 may not respond for a variety of reasons, for example, network traffic, loss of connectivity, overloaded server, inoperable server, etc. There could be multiple master edge servers, multiple peer server and multiple content registrars. The could be ranked according to some scoring, such as CARP or a similar algorithm. Should one not respond for whatever reason, the second highest ranking master edge server, peer server or content registrar would be queried serially.

Other embodiments could query the multiple possible master edge servers, peer servers and content registrar in parallel or at least overlapping in time. The ranking algorithm could vary randomly, through round robin or some other algorithm to spread the load between the possible options. A master peer server for a particular content object request would determine it should be the best or one of the best options and would look external to the POP 120 or even the origin server 112 to find the content object.

One embodiment could have use multiple methods to find content object. The three methods outlined could be used variously by different edge servers 230 and POPs 120. For example, one POP 120 might have access to a content registrar 232 while another POP 120 uses master edge servers. One method could have a primary method and one or more fallback methods. For example, a content registrar 232 could be used primarily, but when the content registrar 232 is not responding for whatever reason, a peer server could be queried. One embodiment could sense problems with one method and start switching over edge servers 230, for example when there are equipment errors or overloading.

Figure 2C:
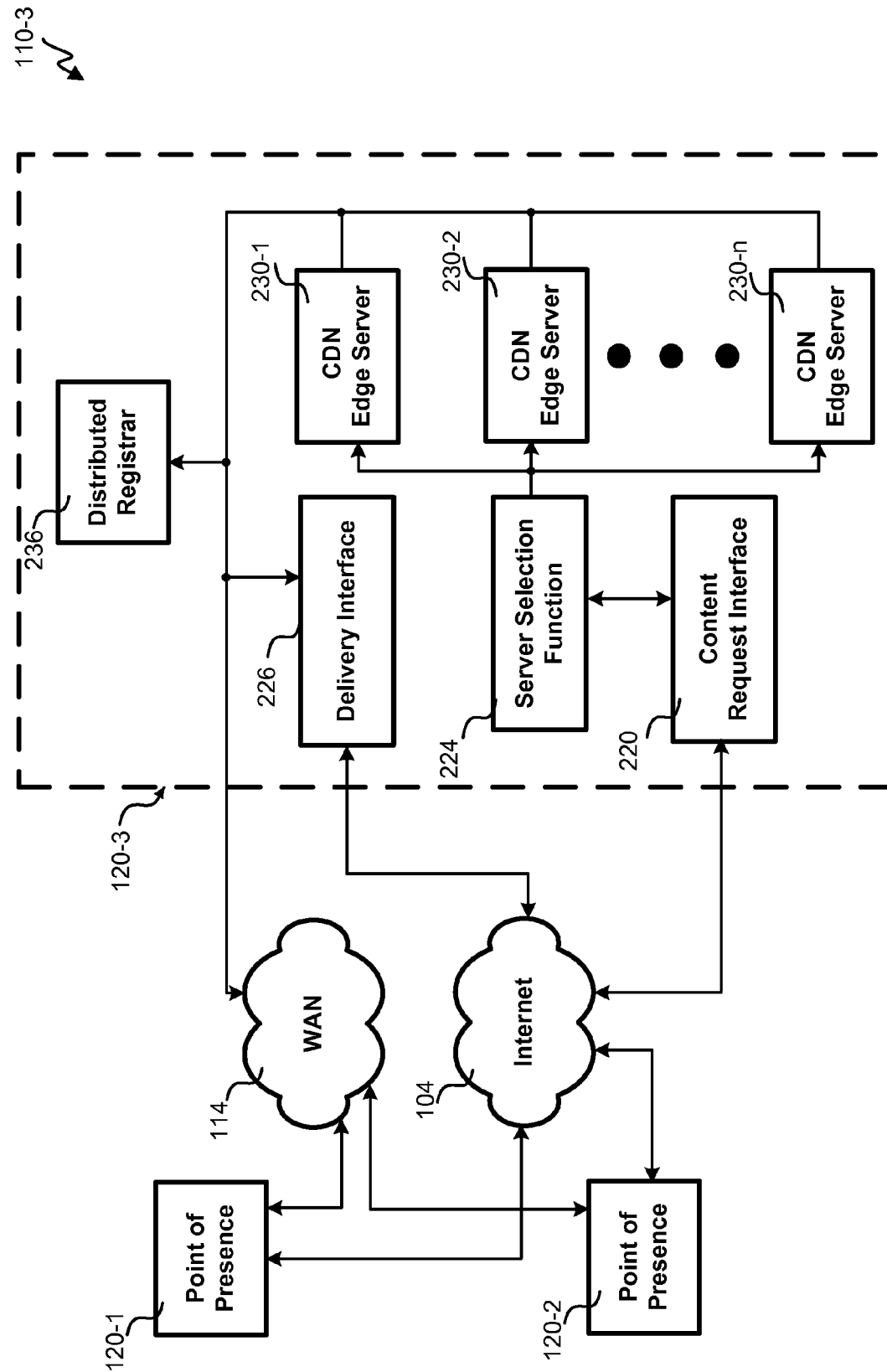

With reference to FIG. 2C, a block diagram of yet another embodiment of the CDN 110-3 is shown coupled to the Internet 104 with additional detail for one of the POPs 120. This embodiment includes a distributed registrar 236 in some or all of the POPs 120. The distributed registrar 236 knows at least where content is stored within the servers within its POP 120. Some embodiments could publish content locations for other POPs 120 into the distributed registrar 236 periodically or as changes are made.

In addition to the distributed registrar 236, other embodiments could also have the content registrar 232 that knows centrally where content is located in the various peer servers. The content registrar 232 could periodically send updates to the various distributed registrars 236. During peer discovery, the distributed registrar 236 could be checked first, and if the content object were not found, the content registrar 232 could be contacted next.

In various embodiments, we discuss different ways for edge servers 230 to find a content object. Similar techniques could be used when populating content objects to edge servers 230. With content object ingest, an edge server 230 likely to receive a content object request would be chosen to store the content object. The content provider 106 can prepopulate the CDN 110 with any number of content objects. The prepopulation algorithm selects the one or more edge servers 230 likely to be assigned a later request for the content object.

Figure 3:
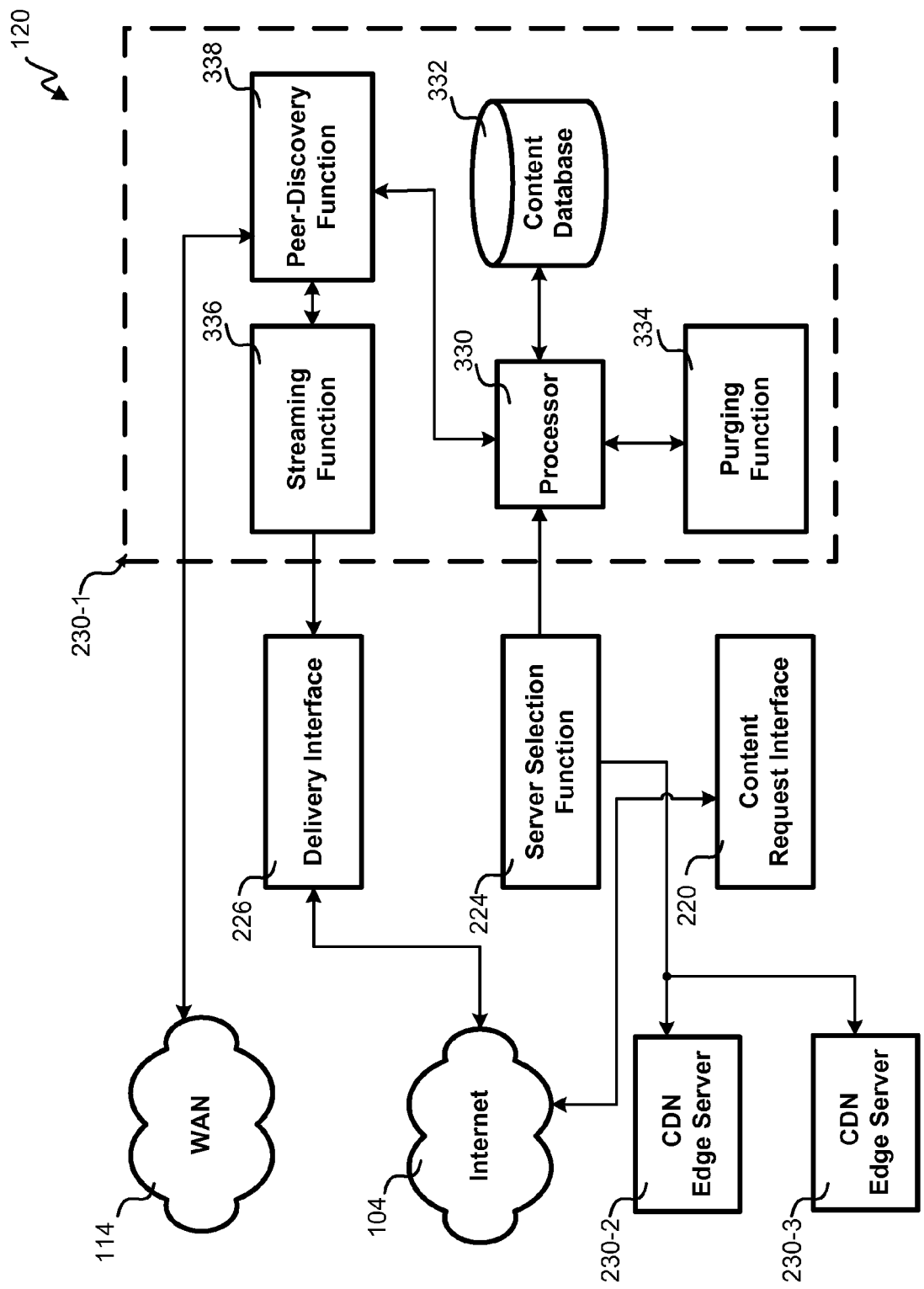
FIG. 3 depicts a block diagram of an embodiment of a POP coupled to the Internet.

With reference to FIG. 3, a block diagram of an embodiment of a POP 120 coupled to the Internet 104 is shown with additional detail for one edge server 230. Although this figure only shows three edge servers 230, the POP 120 may have many more edge servers 230 in various embodiments. The edge server 230 includes a processor 330, a content database 332, a peer-discovery function 338, a purging function 334, and a streaming function 336.

After assigning the request to the edge server 230, the processor 330 passes the request to the peer-discovery function 338. The peer-discovery function 338 first correlates the request for content to a publishing point to determine if the publishing point already exists for the content at the selected edge server 230. The processor 330 is loaded with a number of publishing points where each of the publishing points maps a request for content to a content source either on the selected edge server 230 or another server. A publishing point is the means by which the edge server 330 distributes the requested content to the end user system 102 and includes information relevant to the requested content object and its content source.

A content database 332 stores information that is relevant to the publishing points loaded into the processor 330 in addition to a cache or store holding content objects. The information may include type of content object, QoS goals for providing the content, type of publishing points, delivery options, transport protocol, and the location and configuration of the content source. The content database can have cached content that can be purged when less popular. The publishing point would be deleted or updated to reflect a new source when the content is purged from the content database. Additionally, the content database could include sticky content that is not purged. The sticky content can be hosted content objects or pre-populated content. In some cases, the edge server 230 can serve as the origin server for hosted content objects.

Some POPs 120 might be effectively split into sub-POPs for any number of reasons. In this case, there might be a master server per sub-POP and a higher-level master server for all the sub-POPs. This allows another level of branching and can result in only transmit one copy of a particular content object across metro links to the POP that is available to the hierarchy of master servers.

As discussed above, the peer-discovery function 338 within the edge server 230 uses a peer-discovery algorithm to determine a content source for the requested content object when a publishing point isn't already loaded in the assigned edge server 230. In this way, the edge server 230 determines the source for the content object and serves the requested content object to the end user system 102. In one example, the source of the content is the edge server 230 receiving the request such that the requested content is served directly to the end user system 102 from the content database 332 through the streaming function 336. In this embodiment, the edge server 230 maps content requests to a source of the content in creating a publishing point using the peer-discovery function 338. In another example, the content source is located within the POP 120 receiving the request by a peer server other than the selected edge server 230. In this case, the selected edge server 230 maps its publishing point toward the newly discovered content source found in the peer discovery function and streams the requested content to the end user system 102 using the streaming function 336.

In yet another example, the content source for the requested content is located in another POP 120 remote to the POP 120 receiving the request but within the CDN 110. In this embodiment, characteristics of each neighboring POP 120 are used to determine a list of acceptable neighboring POPs 120 that are externally referenced to obtain a content object not currently stored in the POP 120 receiving the request. Acceptable neighboring POPs 120 are those that can be reached quickly, inexpensively and/or quicker than the content originator 106. Once the list of acceptable neighboring POPs 120 is determined, the peer-discovery function 338 establishes an external link to the acceptable neighboring POPs 120 within the CDN 110 to determine a content source for the requested content object. The acceptable POPs 120 could be contacted in parallel or serially in various embodiments. After determining the content source for the requested content object, the edge server 230 maps its publishing point to the remote content source and serves the requested content indirectly to the end user system 102 through the streaming function 336. In some embodiments, the selected edge server 230 caches the content object in the content database 332.

Although this embodiment maps the publishing point to an external source, other embodiments of the edge server 230 request and cache the content object from the content source. The publishing point would then reference the content database 332 of the edge server. Once one edge server 230 caches the content object, that edge server 230 becomes the master to provide the content object to other edge servers 230. Those other edge servers 230 in the same POP 120 will find the content object through their respective peer-discovery function 338.

Table I indicates an example of neighboring POPs 120 proximate to the particular POP 120 receiving the request within the CDN 110. In this example, a list of acceptable neighboring POPs 120, for establishing the external link, is determined based upon whether each neighboring POP 120 is proximate, in a network sense, to the POP 120 receiving the request. Other parameters and/or performance metrics can be additionally or alternatively used to determine the list of acceptable neighboring POPs 120. For example, one embodiment only allows use of neighboring POPs that can be reached by WAN 114 that uses a high-speed backbone network connection and/or a low cost connection.

TABLE I

| Receiving POP | Acceptable Neighboring POPs to Establish External Link |
|---|---|
| 2 | — |
| 4 | 7, 12, 18 |
| 7 | 4, 9, 15 |
| 9 | 2, 4 |
| 12 | 15 |
| 15 | 18 |
| 18 | 4, 12 |

Periodically, the publishing points that are loaded into the edge server 230 get purged according to an algorithm. The purging function 334 performs the purging algorithm to determine whether a publishing point stays or gets deleted within the processor 330. There are two different types of publishing points that are loaded into the processor 330: (1) sticky publishing points and (2) ephemeral publishing points. The purging function 334 acts upon the total number of publishing points that are cached such that they do not exceed in number a threshold. For example, some embodiments could have 500 sticky publishing points where the threshold for the total number of publishing points is 1,000, 2,000, 2,500, 3,000, 3,500, 4,000, 5,000 or 10,000 in various embodiments. After the threshold is reached, the purging algorithm will remove ephemeral publishing points beyond the threshold according to the purging algorithm.

Sticky publishing points are defined as publishing points that are loaded into the edge server 230 each time the edge server 230 restarts its initialization process and they are not deleted according to any purging algorithm. Sticky publishing points generally correspond to frequently requested content or content that is anticipated to be popular. The sticky publishing points can change over time as mapping changes or usage profiles changes. In some embodiments, sticky publishing points correspond to hosted content or sticky content in the cache for the edge server 230.

Sticky publishing points can be either discovered or predefined upon initialization of the edge server 230 in one embodiment. Discovered sticky publishing points are mapped upon initialization with peer-discovery to potentially update current mapping between each publishing point and content object. Initialization of sticky publishing points can be triggered by restart of the edge server 230 or an indication that there has been an update to configuration information. The edge server 230 loads configuration information that indicates sticky publishing points and preloads any content objects for which the edge server 230 is the master edge server for (i.e., for content objects external to the POP 120 or from customer sources). Where the edge server 230 is not the master, peer discovery is used to find how the discovered sticky publishing point is mapped to a master edge server for each content object. For sources of content objects external to the CDN 110, the sticky publishing point is predefined and does not require discovery. These predefined sticky publishing points do not trigger the peer discovery process.

The second type of publishing points are ephemeral publishing points that are subject to the purging function 334. After a restart of the processor 330, the prior ephemeral publishing points could be repopulated as requests are made for content. Other embodiments could store the ephemeral publishing points during a shutdown or periodically for reload after starting. Ephemeral publishing points are usually loaded into the edge server 230 upon receipt of end user requests for the content objects. Generally, the purging function 334 favors keeping the ephemeral publishing points most likely to be requested again such that the peer-discovery function 338 can be avoided. In some embodiments, the ephemeral publishing points correspond with content wholly or partially cached in the content database 332 and are reconciled with the current state of the cache such that they generally track. In one embodiment, a timer is activated after the last end user system 102 disconnects from a particular content object. The publishing point is purged once the timer reaches a predetermined value without another connection to the particular content object (e.g., 1 day, 1 hour, 30 minutes, 15 minutes, etc. of inactivity).

This embodiment loads all the sticky and ephemeral publishing points into the processor 330 of the edge server 230. Multiple edge server 230 in a POP 120 could share the same sticky publishing points, but each edge server 230 would maintain a set of ephemeral publishing points that is likely to be unique and more likely to track the content in the content database 332. Table II shows an example of different publishing points and how the different types of publishing points may respond to different processes and algorithms disclosed in various embodiments. Sticky publishing points normally have predefined mapping to content, but metadata in the publishing point can specify that peer-discovery should be performed on the sticky publishing point.

TABLE II

Example of Publishing Points Loaded into Edge Servers

| | Sticky Publishing Points | Ephemeral Publishing Points |
|---|---|---|
| Loading Upon Initialization | Yes | No |
| Loading Upon User Request | No (Preloaded) | Yes |
| Peer-Discovery | No (Predefined unless metadata says otherwise) | Performed |
| Purging | Disabled | Allowed |

Figure 4:
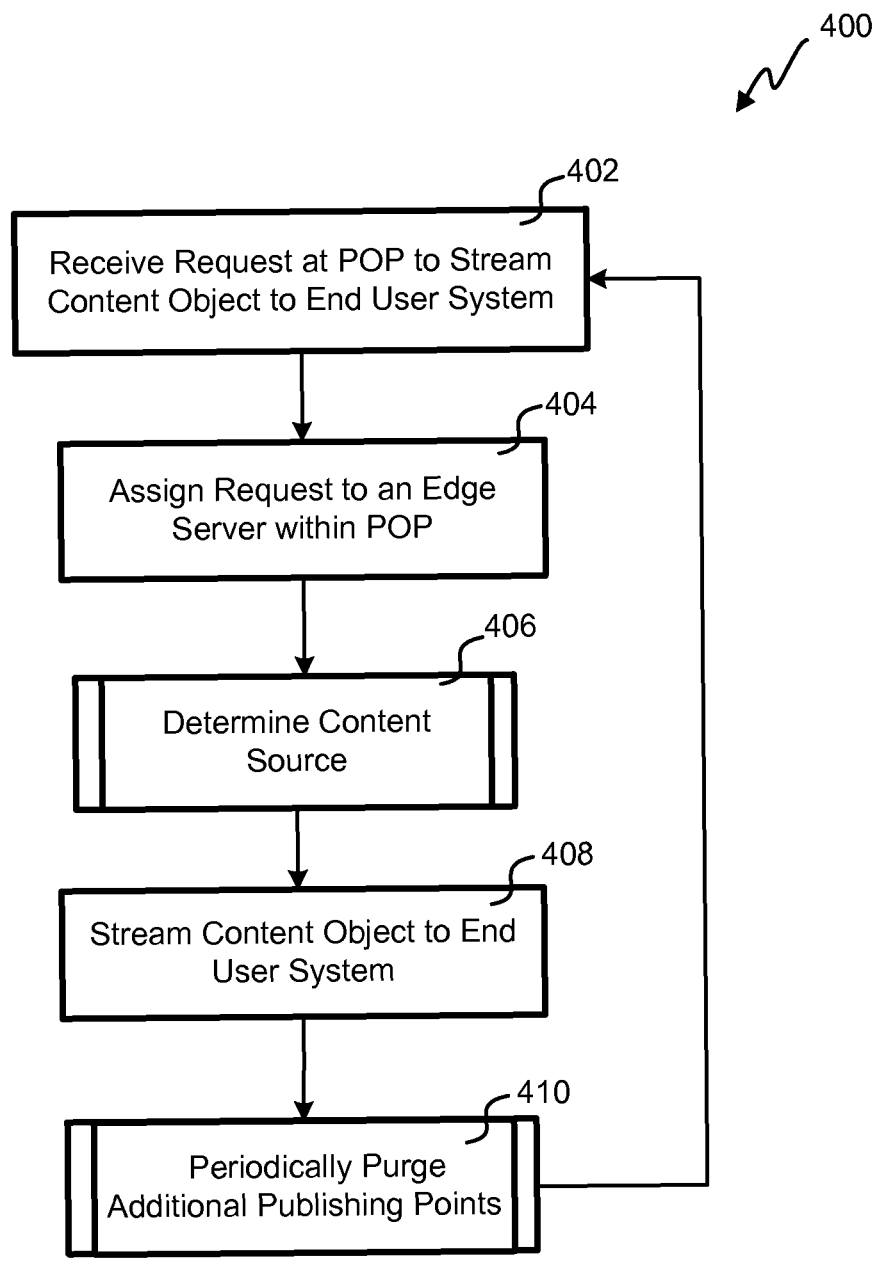
FIG. 4 illustrates a flowchart of an embodiment of a process for streaming content over the Internet to an end user system.

Referring next to FIG. 4, an embodiment of a process 400 for streaming content over the Internet 104 to an end user system 102 is shown. The depicted portion of the process begins in block 402 where the POP 120 receives a request to stream content object to an end user system 102. The request is typically in the form of a URI, but may not necessarily be the case. The server selection function 224 then assigns the request to an edge server 230 within the POP 120 at block 404. After assigning the request to the edge server 230, processing continues to block 406 where content source for the requested content object is determined. As described below, the peer-discovery function 338 queries different peer servers within or remote from the POP 120 to determine the content source for the requested content if the source is not already known.

After discovering the content source at block 406, the streaming function 336 performs any encoding and streams the requested content to the end user system 102 at block 408. The streaming function 336 could transcode the content object to different formats, bitrates, coding, etc. Additionally, any encryption or digital rights management could be performed by the streaming function. The publishing point can map requests through the streaming function 336 to the content database, other edge servers 230 or servers in the POP 120 or other POPs, or the origin server in different situations.

Periodically or constantly, the publishing points that are loaded into the edge server 230 are purged according to an algorithm. In one embodiment, the purging process occurs every 24 hours within the edge server 230 to remove publishing points that are less likely to be requested should the number of publishing points exceed some threshold. Other embodiments may perform the purging process over a shorter or longer period of time such as portion of days, weeks, months or years. One embodiment potentially purges publishing points at each content request or each time a publishing point is added.

Figure 5A:
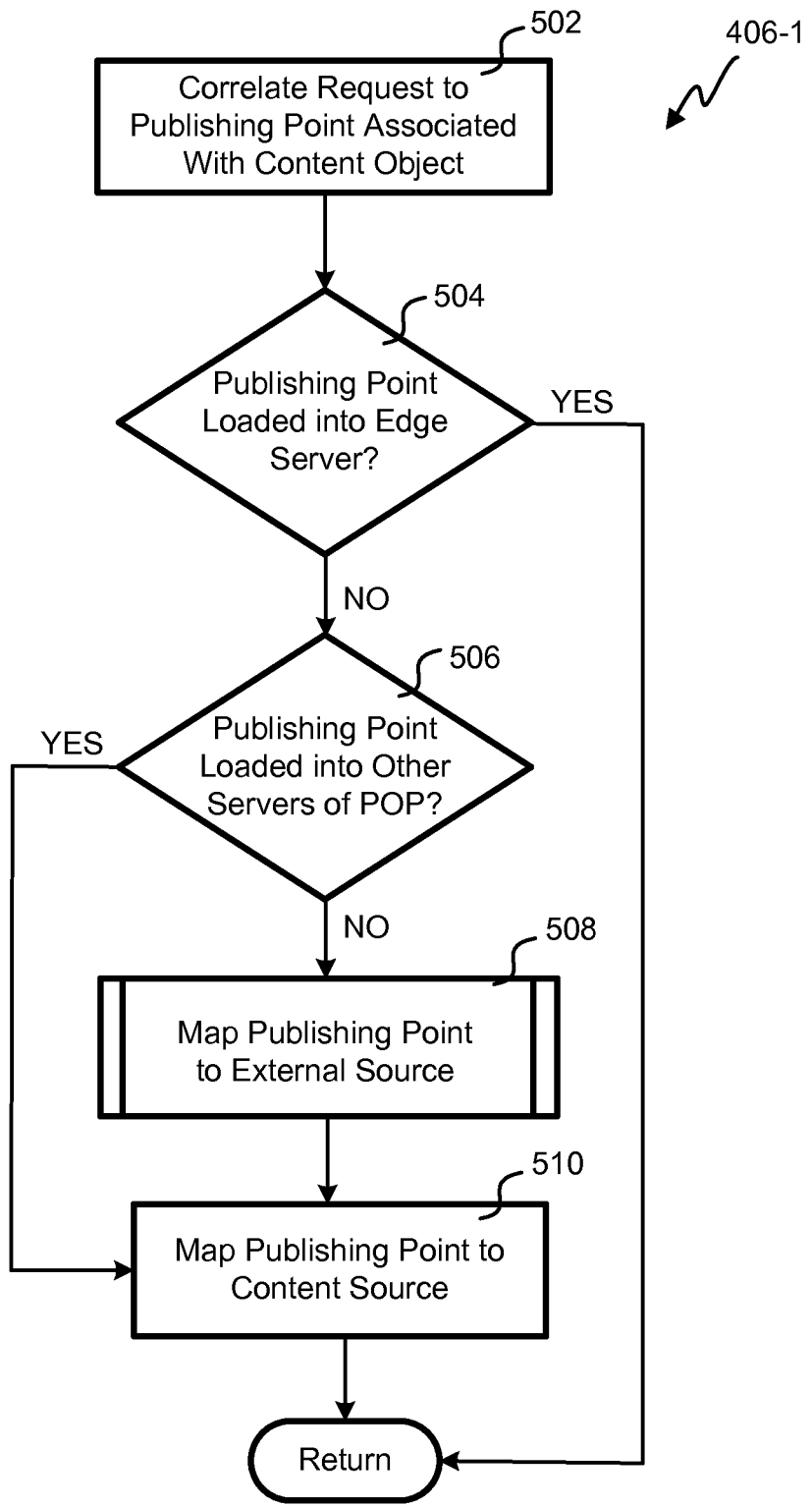
FIGS. 5A and 5B illustrate flowcharts of embodiments of a process for determining a content source for requested content.

With reference to FIG. 5A, a flow diagram of an embodiment of a process 406-1 for determining a content source for requested content is shown. The depicted portion of the process begins in step 502 where the processor 330 correlates the request for content to any loaded publishing point. A determination is made, at block 504 as to whether the publishing point for the content object is loaded into the edge server 230. If the publishing point is loaded into the edge server 230, processing goes back to block 408 of the main process 400 to stream the requested content to the end user system 102. If the publishing point is not loaded in to the edge server 230, processing flows from block 504 to block 506 where another determination is made as to whether the publishing point is loaded into peer servers within the POP 120. In this case, the peer-discovery function 338 determines whether the request for content is mapped by other edge servers 230 or other servers to a content source through their respective publishing points. Other embodiments could check content databases 332 of other edge servers 230 in the POP 120 to determine which has the content object to serve as the source.

If the publishing point is loaded into other servers of POP 120, processing goes from block 506 to block 510 where the publishing point of the edge server 230 is mapped to the content source referenced in the publishing point found during peer discovery. The processing then goes back to the main process 400 to stream the requested content to the end user system 102 from the content source. If the content object is not loaded into any other servers within the POP 120, processing continues to block 508 where the selected edge server 230 establishes an external link to a remote location and make itself as a master relay for the content object within the POP 120.

The remote location(s) is chosen from a list of acceptable neighboring POPs 120 within the CDN 110. In this embodiment, the peer-discovery function 338 selects one or more neighboring POPs 120 and determines whether the content object is stored within the selected neighboring POP 120. In another embodiment, the peer-discovery function 338 selects the neighboring POP 120, and that selected neighboring POP 120 determines the content source for the request through its respective peer-discovery function 338. Where neighboring POPs 120 do not have the content object, the origin server 112 can serve as the content source.

Once the content source for the requested content object is determined at block 508, the processing goes to block 510 where the publishing point of the selected edge server 230 is mapped to the content source. In this embodiment, the peer-discovery function 338 formulates the publishing point of the selected edge server 230 to reference the internal or external content source. In some cases, the publishing point references the content database 332 of the selected edge server 230 and finds the content object externally to populate the content database 332.

Figure 5B:
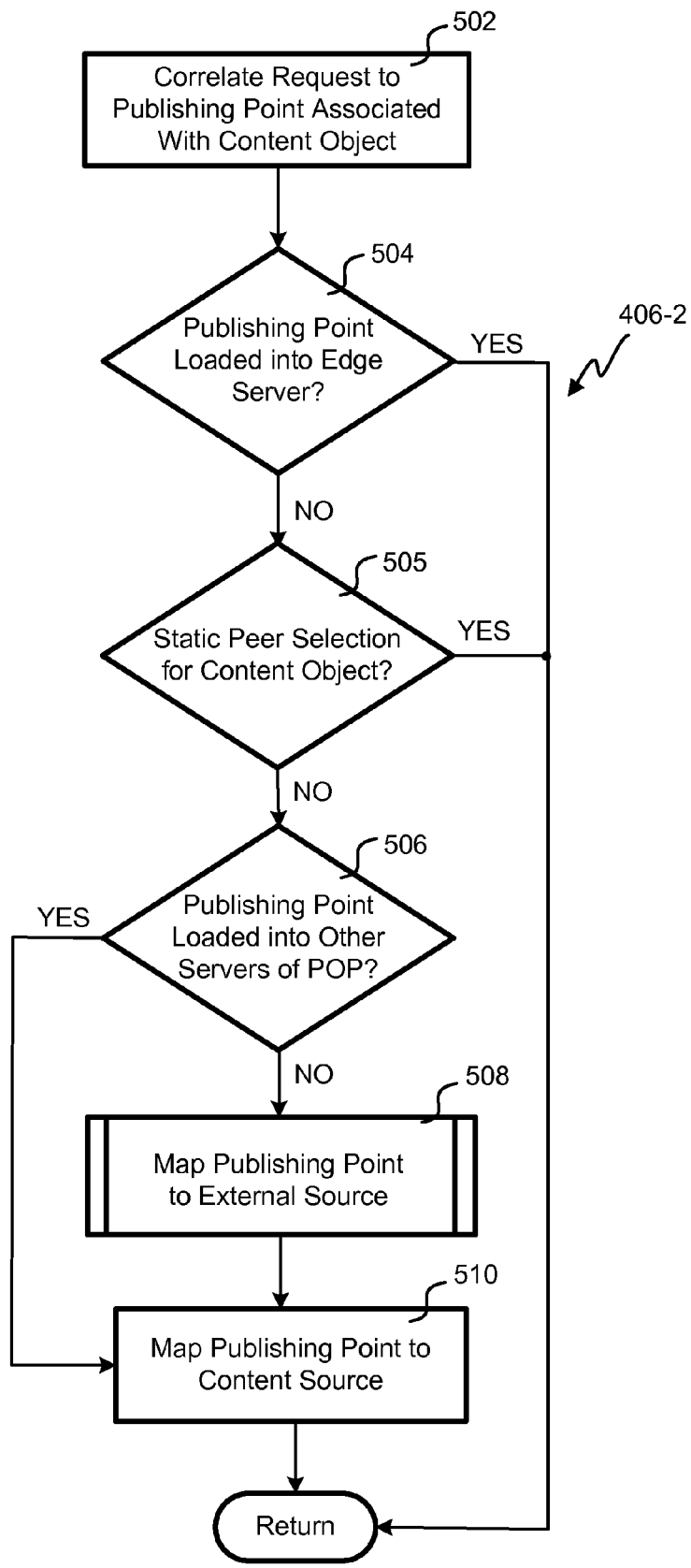

With reference to FIG. 5B, a flow diagram of an embodiment of another process 406-2 for determining a content source for the requested content is shown. This embodiment adds a determination block 505 between blocks 504 and 506. Certain relatively static mapping is used in block 505 prior to full peer discovery. The static mapping could be from a global or distributed registrar 232, 236 that already knows the acceptable mapping for a content object. As servers are taken down or added, the registrar 232, 236 would be updated. Even where a registrar 232, 236 is not used, a list of ingest or other available servers used for sourcing particular content objects or classes of content objects could be specified or determined dynamically by ping, connection and/or other testing.

Figure 6A:
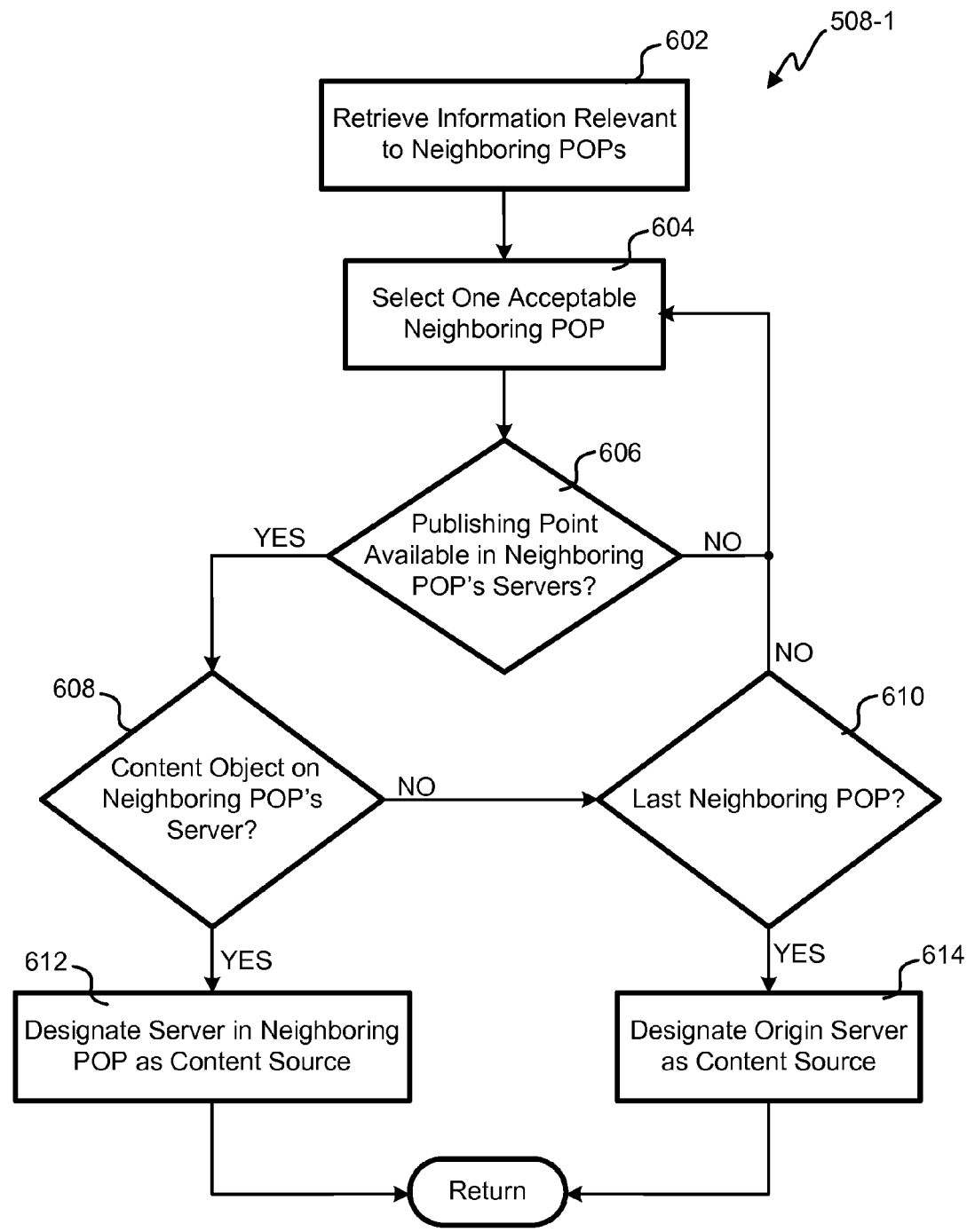
FIGS. 6A and 6B illustrate flowcharts of embodiments of a process for establishing an external link to a remote location and determining a content source.

Referring next to FIG. 6A, a flow diagram of an embodiment of a process 508-1 for establishing an external link to a remote location and determining a content source is shown. External links are relied upon when the POP 120 receiving the request does not have the content object. The depicted portion of the process begins at step 602 where the peer-discovery function 338 retrieves information relevant to the neighboring POPs 120 from the content database 332 and forms a list of acceptable neighboring POPs 120 within the CDN 110. In this embodiment, the list of acceptable neighboring POPs 120 is determined based on parameters, such as routing efficiency, loading of interconnections and/or bandwidth cost between the two POPs, to determine the list of acceptable neighboring POPs 120. Once the closest acceptable neighboring POP 120 is selected from the list, processing continues to block 606 where a determination is made as to whether the publishing point associated with the requested content is available within the servers of the selected neighboring POP 120. If the publishing point is not available within the servers of the selected neighboring POP 120, processing goes back to block 604 for selecting the next acceptable neighboring POP 120.

If the publishing point is available in one of the neighboring POP servers, processing flows from block 606 to block 608, where another determination is made as to whether the requested content object is stored in a peer server within the neighboring POP server. Typically, the peer server is another edge server 230, but not necessarily so. If the content object does exist on the peer server of the neighboring POP, processing continues to block 612, where the peer-discovery function 338 designates the peer server of the neighboring POP as the content source. Processing then goes back to the parent process shown in FIGS. 5A and 5B at block 510 to map the publishing point of the selected edge server 230, within the original POP 120, to the content source in the neighboring POP.

If the requested content object does not exist on any servers within the selected neighboring POP 120, processing flows from block 608 to block 610, where another determination is made as to whether the selected neighboring POP 120 is the last one within the list of acceptable neighboring POPs 120. If the last acceptable neighboring POP 120 is selected, processing goes to block 614, where the peer-discovery function 338 designate the origin server 112 as the content source. If the last acceptable neighboring POP 120 is not selected, processing goes to block 604 where the next acceptable neighboring POP 120 is selected and the processing continues until a content source is determined for the requested content. Some embodiments could in block 610 return to block 606 to retry the list of acceptable neighboring POPs 120 or could even expand the list of acceptable neighboring POPs 120 before resorting to the origin server in block 614.

Figure 6B:
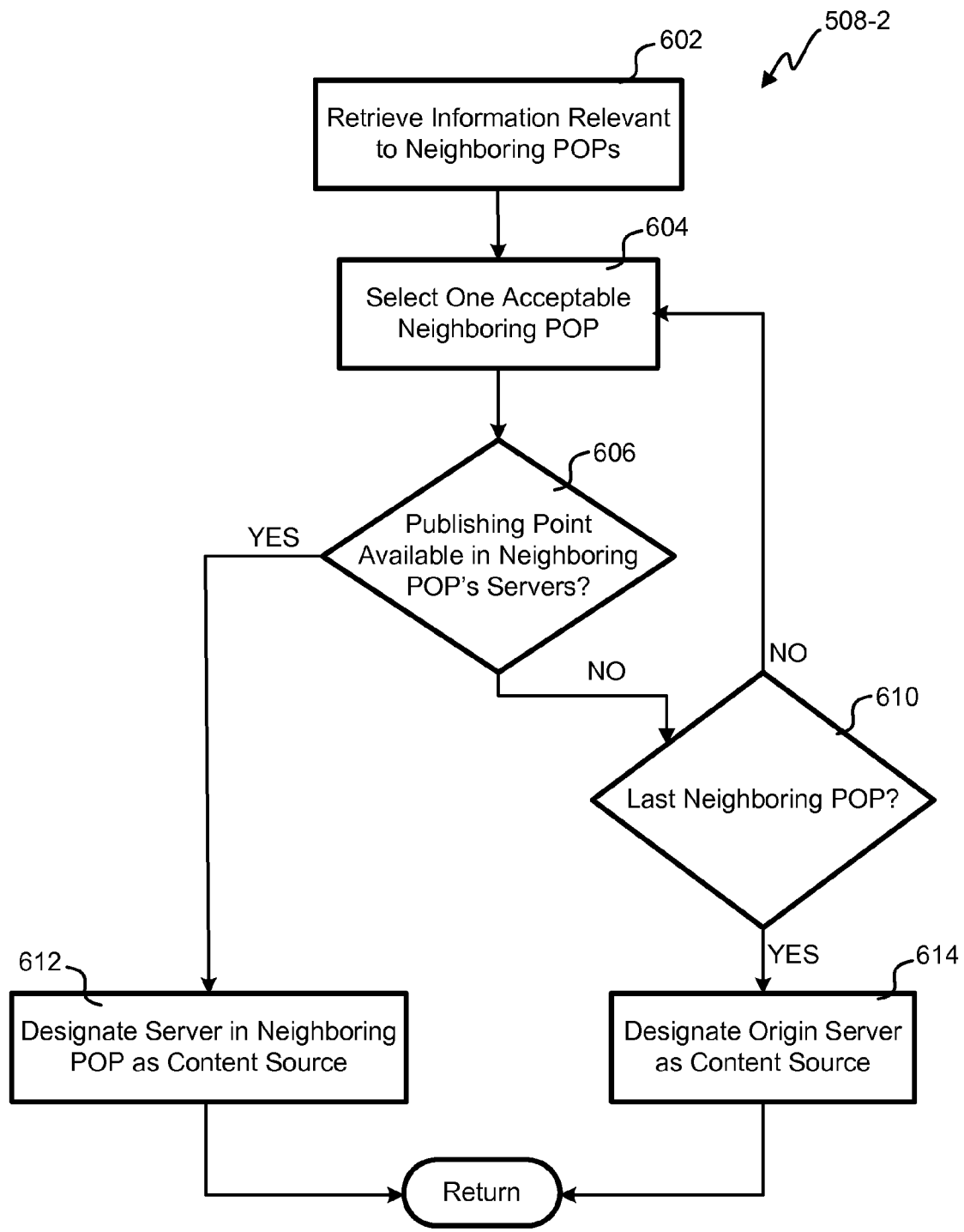

Referring next to FIG. 6B, a flow diagram of another embodiment of a process 508-2 for establishing an external link to a remote location and determining a content source is shown. This embodiment will use any neighboring POP 120 to supply a content object if a publishing point is currently present at the neighboring POP 120. In comparison to the embodiment of FIG. 6A, block 608 is removed from the embodiment to FIG. 6B because there is no determination if the neighboring POP 120 presently has the content object. Where the content object is missing, in a chaining process, the publishing point will direct the request to a peer server in the neighboring POP 120 that serves as the master in its POP. The peer server will request the content object another POP up the chain or the origin server 112 and relay the content object to the edge server 230 that originally received the request.

Figure 7A:
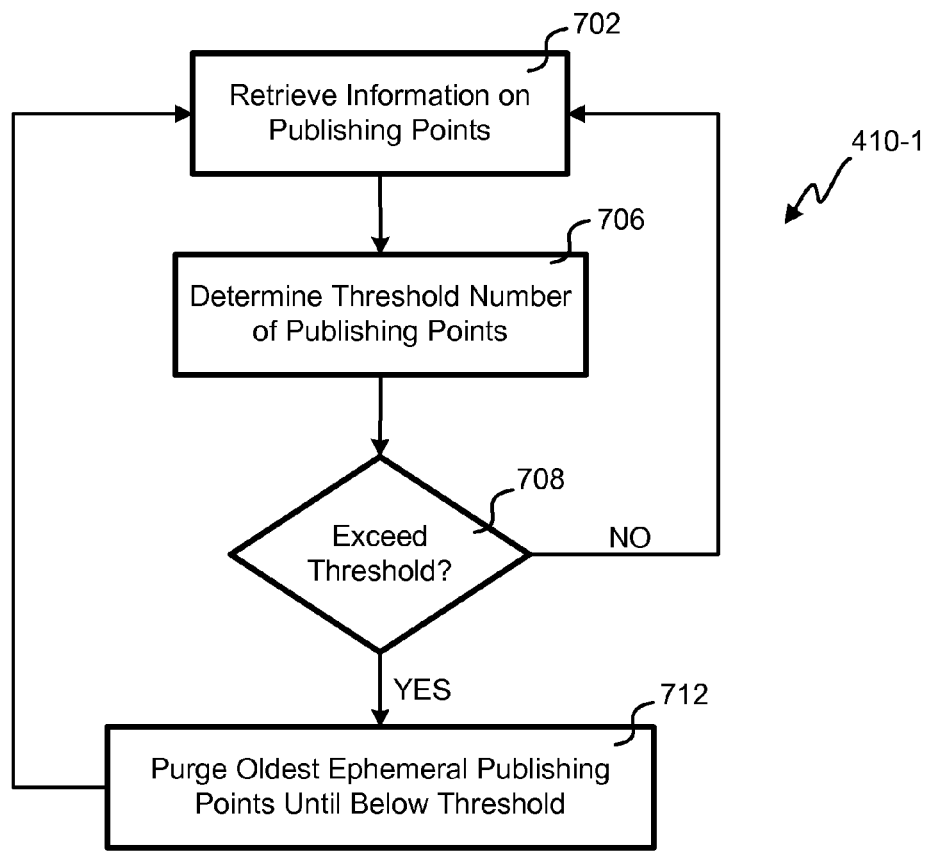
FIGS. 7A and 7B illustrate flowcharts of embodiments of a process for purging publishing points loaded into an edge server.

With reference to FIG. 7A, a flow diagram of an embodiment of a process 410-1 for purging the publishing points loaded into an edge server 230 is shown. The depicted portion of the process 410 begins in block 702 where the purging function 334 retrieves information relevant to the number and types of publishing points from the content database 332. Once the information related to the publishing point is retrieved, processing continues to block 706 where the purging function 334 determines the total number of sticky and ephemeral publishing points.

After determining the total number of publishing points, a determination is made at block 708, as to whether the total number of publishing points exceeds a threshold level. If the number does not exceed the threshold level, no publishing points are purged and processing goes back to block 702 for further management. Some embodiments could prune the publishing points continually or could wait between loops a period of time to prune more periodically. If the number of publishing points does not exceed the threshold level, processing flows from block 708 to block 712 where the ephemeral publishing points over the threshold get deleted to reduce the number to the threshold or below. Processing loops from block 712 back to block 702 for starting the pruning process again.

Figure 7B:
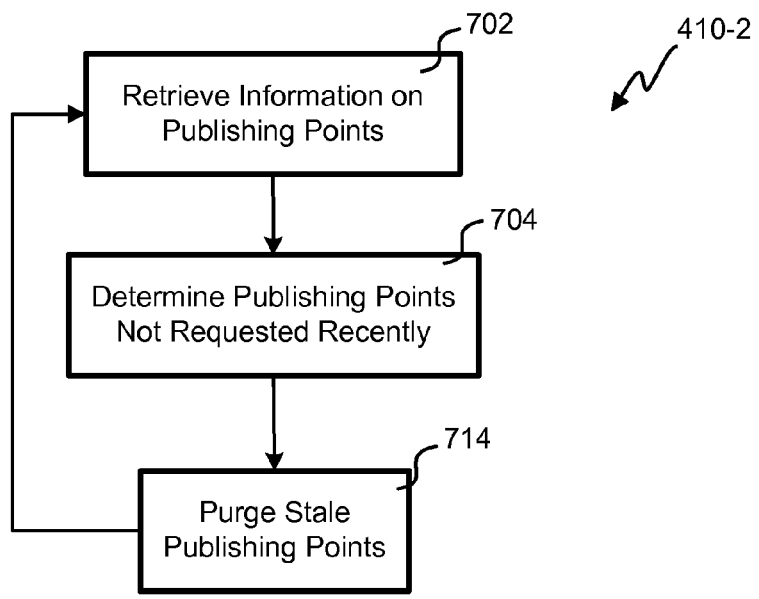

With reference to FIG. 7B, a flow diagram of another embodiment of a process 410-2 for purging the publishing points loaded into an edge server 230 is shown. After receiving information on the age of the publishing points in block 702, a determination is made in 704 on the oldest publishing points without any request. For example, those not requested in the last hour, number of hours, day, week, number of minutes or some other time period could be determined stale. Should too many publishing points be currently stored, the threshold for staleness can be lowered. In block 714, the publishing points older than some staleness threshold are removed. Periodically, the purging process 410-2 can be run to prune out the publishing points unlikely to be used in the future.

While the principles of the disclosure have been described above in connection with specific apparatuses and methods, it is to be clearly understood that this description is made only by way of example and not as limitation on the scope of the disclosure.

What is claimed is:

1. A content delivery network (CDN) for dynamically serving a content object over the Internet to an end user system, the CDN comprising:
   a content object request function that receives a request for streaming content object to the end user system;
   a plurality of points of presence (POPs), wherein:
      the plurality of POPs are geographically distributed;
      the plurality of POPs include a POP, and
   each of the plurality of POPs comprises a plurality of servers including an edge server;
   an edge server selection function that assigns the request to the edge server in the POP, wherein:
      the edge server loads a plurality of publishing points, and
      each publishing point of the plurality of publishing points maps a request for content to a content source, and
      each publishing point of the plurality of publishing points is based on an actual or predicted request for the content;
   a purging function that automatically identifies and removes a subset of the plurality of publishing points according to an algorithm;
   a publishing-point discovery function that:
      correlates the request to a publishing point associated with the content object,
      determines whether the publishing point is loaded into the edge server, and
      queries a remote location away from the edge server to determine the content source if the publishing point is not loaded into the edge server; and
   a streaming function that streams the content object to the end user system.

2. The CDN for dynamically serving the content object over the Internet to the end user system as recited in claim 1, wherein the remote location is another server within the POP.

3. The CDN for dynamically serving the content object over the Internet to the end user system as recited in claim 1, wherein the algorithm comprises:
   automatically determining a subset of publishing points that are designated as sticky; and avoiding removal of the subset of the plurality of publishing points.

4. The CDN for dynamically serving the content object over the Internet to the end user system as recited in claim 1, wherein the algorithm comprises:
   automatically determining a subset of publishing points that are currently coupled to the end user system; and
   avoiding removal of the subset of the plurality of publishing points.

5. The CDN for dynamically serving the content object over the Internet to the end user system as recited in claim 1, wherein the algorithm comprises:
   organizing the plurality of publishing points according to a likelihood they will be used; and
   automatically determining a subset of publishing points beyond a threshold amount that are less likely to be used, wherein the plurality of publishing points that are within the subset are automatically removed.

6. The CDN for dynamically serving the content object over the Internet to the end user system as recited in claim 1, wherein the content object comprises a stream.

7. The CDN for dynamically serving the content object over the Internet to the end user system as recited in claim 1, wherein the content object comprises a live stream.

8. A method for dynamically serving a content object over the Internet to an end user system with a content delivery network (CDN), the method comprising:
   receiving a request to stream the content object to the end user system, wherein:
      the CDN comprises a plurality of points of presence (POPs), which are geographically distributed,
      each of the plurality of POPs comprises a plurality of servers including an edge server,
      the plurality of POPs include a POP, and
      the edge server loads a plurality of publishing points, wherein each publishing point of the plurality of publishing points maps a request for content to a content source;
   assigning the request to the edge server in the POP, which is part of the plurality of POPs;
   correlating the request to a publishing point associated with the content object;
   determining whether the publishing point is loaded into the edge server;
   querying a remote location away from the edge server to determine the content source if the publishing point is not loaded into the edge server;
   mapping the publishing point of the edge server to the content source;
   automatically identifying and removing a subset of the plurality of publishing points according to an algorithm; and
   streaming the content object from the edge server to the end user system.

9. The method for dynamically serving a content object over the internet to the end user system with the CDN as recited in claim 8, wherein the remote location comprises an origin server.

10. The method for dynamically serving a content object over the internet to the end user system with the CDN as recited in claim 8, further comprising determining a neighboring POP from the plurality of POPs, wherein the remote location is the neighboring POP.

11. A method for dynamically serving a content object over the Internet to an end user system with a CDN as recited in claim 8, wherein the algorithm comprises:
   automatically determining a subset of publishing points that are designated as sticky; and
   avoiding removal of the subset of the plurality of publishing points.

12. A method for dynamically serving a content object over the Internet to an end user system with a CDN as recited in claim 8, wherein the algorithm comprises:
   automatically determining a subset of publishing points that are currently coupled to the end user system; and
   avoiding removal of the subset of the plurality of publishing points.

13. A method for dynamically serving a content object over the Internet to an end user system with a CDN as recited in claim 8, wherein the algorithm comprises:
   organizing the plurality of publishing points according to a likelihood they will be used; and
   automatically determining a subset of publishing points beyond a threshold amount that are less likely to be used, wherein the plurality of publishing points that are within the subset are removed.

14. A method for dynamically serving a content object over the Internet to an end user system with a CDN as recited in claim 8, wherein the removing is repeated after a predetermined time period that is a week, a day, a portion of a day, an hour, or a minute.

15. The method for dynamically serving a content object over the Internet to the end user system with the CDN as recited in claim 8, wherein the content object comprises a stream.

16. The method for dynamically serving a content object over the Internet to the end user system with the CDN as recited in claim 8, wherein the content object comprises a live stream.

17. A CDN for dynamically serving a content object over the Internet to an end user system, the CDN comprising:
   means for receiving a request to stream the content object to the end user system, wherein:
      the CDN comprises a plurality of points of presence (POPs), which are geographically distributed,
      each of the plurality of POPs comprises a plurality of servers including an edge server,
      the plurality of POPs include a POP, and
      the edge server loads a plurality of publishing points, wherein each publishing point of the plurality of publishing points maps a request for content to a content source;
   means for assigning the request to the edge server in the POP, which is part of the plurality of POPs;
   means for correlating the request to a publishing point associated with the content object;
   means for determining whether the publishing point is loaded into the edge server;
   means for querying a remote location away from the edge server to determine the content source if the publishing point is not loaded into the edge server;
   means for mapping the publishing point of the edge server to the content source;
   means for automatically identifying and removing a subset of the plurality of publishing points according to an algorithm; and means for streaming the content object from the edge server to the end user system.

18. The CDN for dynamically serving the content object over the Internet the end user system as recited in claim 17, further comprising means for determining a neighboring POP from the plurality of POPs, wherein the remote location is the neighboring POP.

\* \* \* \* \*